Aug. 19, 1924.  1,505,901

G. F. KOLB

AUTOMOBILE BUMPER BRACKET

Filed Sept. 13, 1923

Inventor

George F. Kolb

By Chamberlain & Newman
Attorney

Patented Aug. 19, 1924.

1,505,901

UNITED STATES PATENT OFFICE.

GEORGE F. KOLB, OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

AUTOMOBILE BUMPER BRACKET.

Application filed September 13, 1923. Serial No. 662,430.

*To all whom it may concern:*

Be it known that I, GEORGE F. KOLB, a citizen of the United States, and resident of Bridgeport, in the county of Fairfield and State of Connecticut, have invented certain new and useful Improvements in Automobile Bumper Brackets, of which the following is a specification.

This invention relates to an improved bumper bracket, adapted for automobiles, and particularly a bracket for use at the rear of the frame, an object of the invention being to provide an attaching bracket which may be securely attached to the frame ends, irrespective of the curvature or depth thereof, and which will support the bumper bar in a vertical plane with relation to the road bed.

To this end it is proposed to provide a bracket which will accommodate itself to a curved surface of any degree of curvature, and which will be adjustable to compensate for variation in curvature, to thereby properly position the bumper bar.

A further object is to provide a bracket which may be attached with facility, and without the necessity of drilling, or otherwise adapting the automobile structure to the attachment of the bracket.

With the above and other objects in view, embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
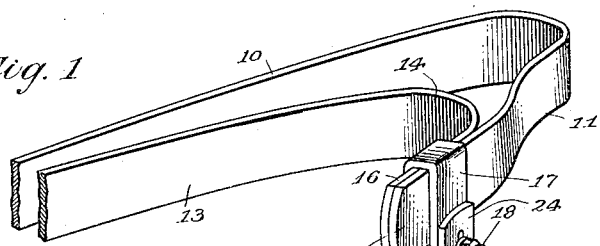
Fig. 1 is a perspective inner side and rear view of one end of a bumper, provided with an attaching bracket, according to one embodiment of the invention.
Figure 3:
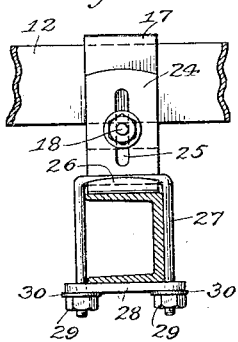
Fig. 3 is a sectional view, taken along the line 3—3 of Fig. 2, and showing the inner side of the bracket.
Figure 2:
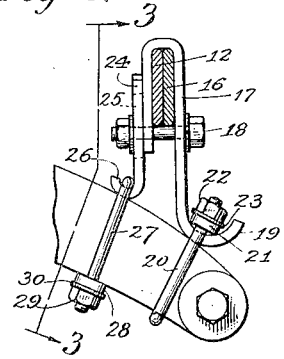
Fig. 2 is a side elevation of the attaching bracket at one side of the frame, provided with a single spring bar bumper.
Figure 4:
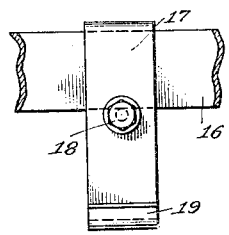
Fig. 4 is a view in elevation showing the rear or outer side of the bracket.

Referring particularly to Figs. 1 to 4 of the drawings, the embodiment of the invention shown therein comprises a single convexly curved spring bar bumper 10, having its rear ends bent inwardly as at 11, and provided with aligned straight attaching portions 12. A secondary reinforcing spring bar 13 is disposed at the rear of the bar 10, and has its end portions bent rearwardly and inwardly, as at 14, the terminals 16 being straight and alligned and engaging the portions 12 in overlying relation. The portions 12 and 16 are adapted to be clamped to the attaching brackets, which in turn are secured to the rear ends of the automobile frame. Inasmuch as the attaching brackets at each side are identical in construction, only one will be described in detail.

The attaching bracket comprises an inverted U-shaped band 17 embracing the spring bar ends 12 and 16, and having a transverse bolt 18 connecting the two sides beneath the spring ends to thereby position and clamp them. The outer leg of the band is extended downwardly and terminates in a curved hook portion 19, adapted to engage the upper surface of the frame, and secured thereto by means of a stirrup 20 embracing the frame, and a cross-bar 21 engaged over the ends of the stirrup within the hook portion and secured by nuts 22 screwed upon the threaded ends of the stirrup, lock washers 23 being interposed between the cross-bar and the nuts.

Upon the inner side of the band 17 there is provided a vertically adjustable supporting member 24, having a vertical slot 25 therein engaged by the bolt 18, and secured in adjusted relation by tightening of the nut on the end of the bolt. The lower end of the member 24 is bent into the form of a curved hook 26, which engages the upper surface of the frame, and is secured by means of a stirrup 27, having its transverse portion engaging the hook, and provided at its ends with a cross-bar 28 extending across the lower surface of the frame, and held by nuts 29 upon the threaded ends of the stirrup, lock washers 30 being interposed between the cross-bar and the nuts.

In attaching the bracket, the hook portion 19 is first engaged upon the frame and loosely secured by means of the stirrup 20. The member 24 being loose, for vertical adjustment, the bracket is positioned so that the spring bumper bar is in a vertical plane with respect to the road bed, whereupon the member is adjusted so that its lower end engages the frame, being then fixed in this position by tightening the nut of the bolt 18.

The bracket, according to the invention, is adapted for attachment to frames of different curvatures and depths, and in every case the bumper will be properly positioned and efficiently supported. The material from which the bracket is formed is preferably strap steel, bent to shape, thereby providing a structure of great strength, free from possible fracture or breakage, and which may be manufactured with facility and comparative economy.

It will be noted, that the hook ends may engage the frame with line contact, at any point at which they may rest, depending upon the curvature of the frame, and that the stirrups will be so disposed that their center lines pass through the plane of the line of contact, thus insuring a rigid connection which cannot work loose.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In an automobile bumper for use upon the frame ends of an automobile, a bumper bar, and an attaching bracket supporting said bar and comprising an inverted U-shaped member including an adjustable two-piece leg adapted to be extended or contracted, connecting means for connecting one of said legs to the frame, and a single bolt adapted to secure the adjustable legs to each other to fix the position of the bracket, and to clamp the bumper bar in the bracket.

2. In an automobile bumper for use upon the frame ends of an automobile, a bumper bar, and an attaching bracket supporting said bar and comprising means secured to the frame and adapted to have pivotal adjustment movement thereon to position said bumper bar, and other means secured to the frame in spaced relation to said first means, an adjustable connection between the last means and the bracket, and a single bolt adapted to secure the adjustable connection and to clamp the bumper bar in the bracket.

3. In an automobile bumper for use upon the frame ends of an automobile, a bumper bar, and an attaching bracket supporting said bar and comprising a member clamped about said bar, a stirrup embracing the frame and adapted to connect the bracket thereto, a second stirrup embracing the frame in spaced relation to said first stirrup, an adjustable connection between said second stirrup and the bracket, and a single bolt adapted to secure the adjustable connection and to clamp said member about said bar.

4. In an automobile bumper for use upon the frame ends of an automobile, a bumper bar, and an attaching bracket supporting said bar and comprising means engaging the frame with line contact, means securing said last named means to the frame, other means adjustably connected to the bracket and engaging the frame with line contact in spaced relation to said first means, means for securing said other means to the frame, an adjustable connection between said other means and the bracket comprising a single bolt, said bolt functioning to clamp said bumper bar to said bracket.

5. In an automobile bumper for use upon the frame ends of an automobile, a bumper bar, and an attaching bracket supporting said bar and comprising a curved hook portion engaging the frame with line contact, a stirrup engaging said hook portion at its concave side and embracing the frame to secure it thereto, other means adjustably connected to the bracket, means for securing said other means to the frame, and a single bolt adapted to secure said other means to said bracket and to clamp said bumper bar to the bracket.

6. In an automobile bumper for use upon the frame ends of an automobile, a bumper bar, and an attaching bracket supporting said bar and comprising connecting means for connecting said bracket to the frame and permitting pivotal adjustment movement of said bracket about a horizontal axis, other connection means spaced therefrom and provided with a vertical slot, and a bolt engaging said slot to connect said other connection means to the bracket and permit vertical adjustment thereof, said bolt also functioning to clamp said bar in said bracket.

7. In an automobile bumper for use upon the frame ends of an automobile, a bumper bar, and an attaching bracket comprising an inverted U-shaped band arranged about said bar to support it, one leg of said band being extended and bent into a curved hook end engaging the frame, means for securing said hook end to the frame, a supporting member adjustably connected to said U-shaped band and having its end bent into a curved hook engaging the frame in spaced relation to said first hook end, means for securing said second hook end to the frame, and a bolt adapted to adjustably secure the bracket and supporting member to each other and to clamp said band to said bumper bar.

8. A bumper attaching bracket comprising a bumper supporting member of inverted U-shape, means adapted to secure one leg of said supporting member to an automobile in an angularly adjusted position, a vertically adjustable connection member secured to the other leg of said supporting member, means for connecting the connection member to the frame in spaced relation to the means first mentioned, and a single bolt constituting means securing the connection member to the supporting member and securing said bumper in the supporting member.

Signed at Bridgeport, in the county of Fairfield and State of Connecticut, this 11th day of September, A. D. 1923.

GEORGE F. KOLB.

Witnesses:
E. P. BLANCHARD,
T. S. PENDAGAST.